April 26, 1932.  L. J. LESH  1,855,859
ELECTRIC MOTOR
Filed Nov. 4, 1929

Inventor
Laurence J. Lesh
R.S. Richardson Atty.

Patented Apr. 26, 1932

1,855,859

UNITED STATES PATENT OFFICE

LAURENCE J. LESH, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

ELECTRIC MOTOR

Application filed November 4, 1929. Serial No. 404,575.

The present invention relates in general to improvements in electric motors.

The main object of the invention is the provision of a small motor of simple construction which may be operated at a very low speed.

According to one feature of the invention, motors embodying the principles thereof may be constructed to operate at very low speeds thereby eliminating the necessity of gear reduction where low speeds are required.

Another feature of the invention is the simplicity of construction which insures great reliability and continuous operation of the motor with little or no attention. This makes it especially adaptable for use where only a small amount of power but continuous operation is required, for example, in constantly moving electric advertising signs.

According to another feature of the invention the motor may be operated either on direct current or on alternating current.

A further feature of the invention resides in the utilization of a magnetic clutch action as a means for driving the rotor of the motor.

Figure 1:
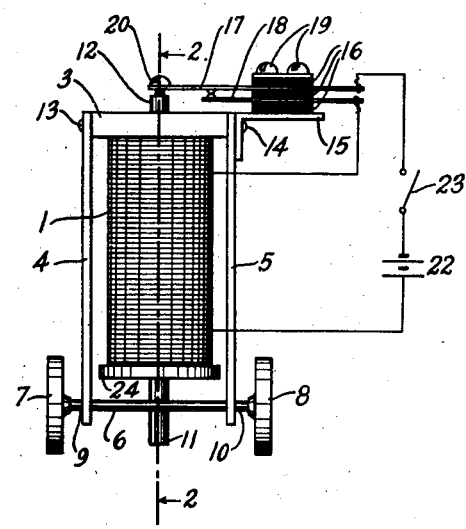
Figure 2:
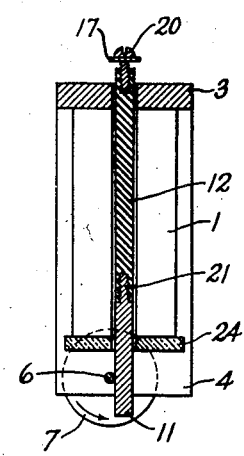

Other detailed features and a complete understanding of the invention may be had from the following specification when read in connection with the accompanying drawings in which:

Fig. 1 is a front view of the assembled motor showing the general construction and also showing the circuit of the motor when operating on direct current; and Fig. 2 is a cross-sectional view taken along the line 2—2 of Fig. 1.

Referring to the drawings, the motor consists essentially of a solenoid magnet 1 having a base-plate 3 made of soft iron or other magnetic material. The two brackets 4 and 5 are attached to opposite sides of the base-plate 3 and held rigid by means of screws 13 and 14, respectively. These side brackets are also made of suitable magnetic material. A horizontal shaft 6 is mounted through holes in the lower end of the side brackets 4 and 5. Fly wheels 7 and 8 are attached to the outer ends of shaft 6. Suitable bearings are provided at 9 and 10 to allow the shaft to rotate freely within the brackets.

The solenoid is provided with a plunger extending through the center of the magnet and through the base-plate 3 and the spool-head 24. This plunger consists of two parts, the upper portion 12 being made of brass or other non-magnetic material, while the lower portion 11 is made of soft iron or other suitable magnetic material. The lower portion 11 has a small threaded part 21 which is screwed into the upper part 12 of the plunger. The hollow core of the solenoid is sufficiently large that the plunger may move freely up and down without touching the sides of the core. The shaft 6, with fly wheels 7 and 8, is so mounted in the side brackets 4 and 5 that it makes contact with the plunger when the plunger is in the center of the hollow core.

An angle bracket 15 is mounted on the side of the plate 5 and also secured to the base-plate 3 by the screws 14. Mounted on this bracket by means of screws 19 is a spring combination comprising springs 17 and 18 suitably insulated from each other and from the frame by means of the insulators 16. The upper spring 17 projects over the hollow core of the solenoid and is provided at its extremity with a hole through which the screw 20 is passed and threaded into the upper portion 12 of the plunger. The spring 17 is not tightly screwed to the plunger 12, but the screw 20 is long enough to allow the plunger to move upward for a short distance before it strikes the spring 17 and breaks its contact with spring 18. The spring 17 is used as a guide for the plunger and keeps it in the center of the hollow core so that it does not rub against the walls of the core.

The detailed operation of the motor will now be explained. The circuit connections for operation on direct current are shown in Fig. 1. The winding of the solenoid is included in the circuit in series with the contact springs 18 and 17, a switch 23, and a battery 22. When the switch 23 is closed, the solenoid magnet is energized by current flowing from battery 22. The energization of the solenoid magnet tends to draw the plunger upward. The magnetic path includes the base-plate 3, the side brackets 4 and 5, the shaft 6, and the plunger 11. The plunger is thereby attracted to the shaft 6 and at the same time is drawn upward into the solenoid. As the plunger moves upward it remains attracted to the shaft 6, and this results in the rotation of the shaft and fly wheel in a counter-clockwise direction, as indicated by the arrow in Fig. 2. After the plunger has moved upward a short distance, the upper portion 12 strikes the spring 17 and moves it upward, thereby breaking its contact with spring 18 and opening the circuit of the solenoid magnet. As soon as the magnet deenergizes, the soft iron plunger 11 is no longer attracted and consequently drops to its original position. Its downward motion is limited by the spring 17. Since the magnet is not energized as the plunger descends, there is no magnetic attraction between the plunger 11 and the shaft 6, and the plunger drops without tending to rotate the shaft.

As soon as the plunger has descended far enough to allow springs 17 and 18 to again make contact, the circuit is again closed for the solenoid magnet. The magnet energizes and draws the plunger 11 upward, again rotating the shaft 6 due to the magnetic attraction between the plunger and the shaft. This cycle of operation is repeated as long as the switch 23 is closed. The result is a continuous rotation of the shaft in the direction indicated by the arrow in Fig. 2. The fly wheels 7 and 8 tend to maintain this rotation at a steady and constant speed. The speed of the motor will, of course, depend upon the diameter of the shaft 6. If the size of the shaft be increased, the speed will decrease, but at the same time the motor will develop considerable more power. The speed may be further controlled by adjusting the stroke of the plunger and the tension of the spring 17.

If desired, the motor may be operated on alternating current instead of direct current. In this case the interrupter springs 17 and 18 are omitted from the circuit. The commerical or alternating current is connected directly to the winding of the solenoid magnet through the switch 23, by short-circuiting springs 17 and 18. Assuming that the frequency of the power is 60 cycles per second, the solenoid magnet will be energized and deenergized 120 times per second. Each time it is energized the plunger 11 will be moved upward and, due to its magnetic attraction to the shaft 6, will rotate the shaft and fly wheels in a counterclockwise direction. Although the interrupter springs are not included in the circuit when the motor is operated on alternating current, the spring 17 serves as a guide for the plunger and also to limit the movement of the plunger.

It has been found that considerable power may be developed by a motor of this type and its adaptability to service where conditions require that the motor be run continually and at low speeds will be readily seen. The motor is simple in construction, represents a very small investment, and requires little or no attention.

Having described the invention, what is thought to be new and is desired to have protected by Letters Patent will be pointed out in the appended claims.

What is claimed is:

1. In combination, a solenoid having a plunger, a shaft mounted at right angles to said plunger and in contact therewith, and means for energizing said solenoid whereby said plunger is drawn into said solenoid and rotates said shaft due to the magnetic attraction between the plunger and shaft.

2. In combination, a solenoid, means for intermittently energizing said solenoid, a shaft supported at right angles to the axis of said solenoid by means of bearings, and a plunger for said solenoid in contact with said shaft and adapted to rotate the shaft while drawn into the solenoid when the solenoid is energized and to retract without rotating said shaft when the solenoid is deenergized.

3. In an electric motor, a shaft, a vibratory member in loose contact with said shaft at a point between the ends thereof, a magnetic path including said shaft and said vibratory member, and means for producing a magnetic flux in said path whereby said shaft is rotated by means of its magnetic attraction to said vibratory member.

4. In an electric motor, a shaft, a magnet having a vibratory armature, means for supporting said shaft in a position such that it is in loose contact with said armature at a point between the ends of said shaft, and means for intermittently energizing said magnet thereby rotating said shaft due to the magnetic attraction between said shaft and said armature.

5. In a motor, two shafts positioned at right angles to each other and in loose contact, electromagnetic means for imparting a reciprocatory movement to one shaft, said means being effective to cause said shafts to cohere during movement of the reciprocating shaft in one direction, and means supporting the other shaft for rotation.

6. In a motor, a rotatable shaft, a longitudinally movable member positioned at right angles to said first shaft and in contact therewith, a magnetic circuit including said member and said shaft, and means for producing flux in said circuit to move said member and cause the same to rotate said shaft.

7. In a motor, a rotatable shaft, a magnet, an armature for said magnet in contact with said shaft at a point removed from either end thereof, and a path for magnetic flux including the said armature and the said shaft.

8. In a motor, a rotatable shaft, a magnet, an armature for said magnet in contact with said shaft, and two magnetic paths including said armature in common and each including a different portion of said shaft.

9. In a motor, a rotatable shaft a portion of which is cylindrical in form with a smooth exterior surface, a reciprocating member in contact wtih said surface, and means for causing said member to cohere to said surface and rotate the shaft while moving in one direction but not in the other.

10. An electric motor comprising a solenoid having a plunger, a shaft at right angles to said plunger, a point intermediate to the ends of said shaft being in loose contact with a point along the length of said plunger, and a circuit for energizing said solenoid to impart a longitudinal movement to said plunger and at the same time cause said plunger and shaft to cohere for the purpose of rotating said shaft.

11. An electric motor comprising a solenoid having a plunger, a shaft at right angles to said plunger, a point intermediate to the ends of said shaft being in loose contact with a point along the length of said plunger, a circuit for energizing said solenoid to impart a longitudinal movement to said plunger and at the same time cause said plunger and shaft to cohere for the purpose of rotating said shaft, and means effective after said plunger has moved a predetermined distance for breaking said circuit to allow said plunger to restore to normal without rotating said shaft.

12. In a motor, a cylindrical plunger, a rotatable shaft at right angles to said plunger and having a point intermediate to the ends thereof in contact with the cylindrical surface of said plunger, a solenoid, and means for intermittently energizing said solenoid to impart a reciprocatory motion to said plunger and at the same time rotate said shaft due to the magnetic attraction between the shaft and plunger at the point of contact each time said solenoid is energized.

13. In an electric motor, a solenoid having a vibratory plunger, a shaft supported in bearings at right angles to said plunger and in loose contact therewith, means for intermittently energizing said solenoid to rotate said shaft by the magnetic attraction between the shaft and plunger each time the latter is drawn into said solenoid, and a flywheel on said shaft to produce continuous rotation.

In witness whereof, I hereunto subscribe my name this 31st day of October, A. D. 1929.

LAURENCE J. LESH.